United States Patent
Chew

(10) Patent No.: US 8,155,384 B2
(45) Date of Patent: Apr. 10, 2012

(54) SYSTEM AND METHOD FOR AUTOMATIC EXTERIOR AND INTERIOR INSPECTION OF VEHICLES

(75) Inventor: Khien Meow David Chew, Singapore (SG)

(73) Assignee: Stratech Systems Limited, Singapore (SG)

( * ) Notice: Subject to any disclaimer, the term of this patent is extended or adjusted under 35 U.S.C. 154(b) by 1113 days.

(21) Appl. No.: 11/665,142

(22) PCT Filed: Oct. 11, 2005

(86) PCT No.: PCT/SG2005/000351
§ 371 (c)(1),
(2), (4) Date: Jan. 24, 2008

(87) PCT Pub. No.: WO2006/041416
PCT Pub. Date: Apr. 20, 2006

(65) Prior Publication Data
US 2008/0136625 A1 Jun. 12, 2008

(30) Foreign Application Priority Data
Oct. 11, 2004 (SG) ................................ 200406194-1

(51) Int. Cl.
*G06K 9/00* (2006.01)
*H04N 7/18* (2006.01)
(52) U.S. Cl. .................. 382/104; 382/220; 348/143
(58) Field of Classification Search .................. 382/100, 382/103, 104, 105, 106, 143, 155, 168, 173, 382/181, 189, 203, 209, 224, 232, 254, 274, 382/276, 284–291, 305, 312; 340/5.81, 907; 73/863.21; 348/143; 713/186; 177/25.14; 250/25.14
See application file for complete search history.

(56) References Cited

U.S. PATENT DOCUMENTS

| 5,449,864 A * | 9/1995 | Beatty et al. ............... 177/25.14 |
| 6,249,567 B1 | 6/2001 | Rothschild et al. |
| 6,542,580 B1 | 4/2003 | Carver et al. |
| 6,840,120 B2 * | 1/2005 | Sakairi et al. .............. 73/863.21 |
| 6,856,344 B2 * | 2/2005 | Franz ............................ 348/143 |
| 6,936,820 B2 * | 8/2005 | Peoples ..................... 250/336.1 |
| 6,972,693 B2 * | 12/2005 | Brown et al. ................. 340/907 |
| 7,439,847 B2 * | 10/2008 | Pederson ..................... 340/5.81 |
| 7,596,275 B1 * | 9/2009 | Richardson et al. .......... 382/224 |
| 7,634,662 B2 * | 12/2009 | Monroe ........................ 713/186 |
| 2003/0185340 A1 | 10/2003 | Frantz |

FOREIGN PATENT DOCUMENTS

| EP | 0485192 A2 | 5/1992 |
| EP | 0962894 A2 | 12/1999 |
| WO | 00/33060 A2 | 6/2000 |
| WO | WO 2004/042673 A2 | 5/2004 |
| WO | 2004/061771 A1 | 7/2004 |

OTHER PUBLICATIONS

International Search Report for PCT/SG2005/000351, dated Jan. 4, 2006.

* cited by examiner

*Primary Examiner* — Seyed Azarian
(74) *Attorney, Agent, or Firm* — Mitchell P. Brook; McKenna Long & Aldridge LLP

(57) ABSTRACT

A system and method for automatic exterior and interior inspection of vehicles. The system comprises imaging means for capturing an image of the undercarriage of the vehicle as it is being driven into a secure area; imaging means for capturing an image of a luggage compartment of the vehicle as it is being driven into the secure area; database means for storing the captured images; and monitoring means operable to facilitate activation of an alarm based on the captured images.

14 Claims, 6 Drawing Sheets

SYSTEM AND METHOD FOR AUTOMATIC EXTERIOR AND INTERIOR INSPECTION OF VEHICLES

FIELD OF THE INVENTION

The present invention relates to external and internal scanning of vehicles. In particular, the invention relates to scanning an undercarriage and a luggage compartment of a vehicle.

BACKGROUND OF THE INVENTION

In recent years, motor vehicles have been used by terrorist groups for bombing civilian and military areas, For example, terrorists may secretly install a bomb in a vehicle parked in a civilian area and detonate the bomb by a timer or remote device causing losses to human lives and property.

Often, a legitimately parked motor vehicle from a public area is stolen or hijacked by a terrorist for loading the vehicle with explosives and brought to a public area by the terrorist or others.

There is an immediate need to control access and inspection of vehicles entering sensitive civilian and military areas.

SUMMARY OF THE INVENTION

In accordance with a first aspect of the present invention there is provided a system for automatic exterior and interior inspection of vehicles, said system comprising imaging means for capturing an image of the undercarriage of the vehicle as it is being driven into a secure area; imaging means for capturing an image of a luggage compartment of the vehicle as it is being driven into the secure area; database means for storing the captured images; and monitoring means operable to facilitate activation of an alarm based on the captured images.

In accordance with a second aspect of the present invention there is provided a method of automatic exterior and interior inspection of vehicles, said system comprising capturing an image of the undercarriage of the vehicle as it is being driven into a secure area; capturing an image of a luggage compartment of the vehicle as it is being driven into the secure area; storing the captured images; and monitoring the captured images for facilitating activation of an alarm.

An embodiment of the invention provides an apparatus for the automatic exterior and interior inspection of vehicles being driven into a first area. The apparatus comprises: imaging means, database means, trace means and means for comparing. The imaging means is for capturing an image or sequence of images of the vehicle's number plate (and optionally the entire vehicle), the undercarriage of a vehicle, luggage compartment, driver/passengers as it is being driven into the first area and processing these images using computer vision methods and algorithms. The database means is for storing images of vehicles which are permitted into the first area and these stored images could be retrieved for comparison and analysis. The trace means is for explosive trace detection of the vehicle interior (e.g. passenger compartment) as it is being driven into the first area. The means for comparing is for comparing the captured images of the vehicle being driven into the first area with one or more of the stored images of the vehicles on the database means.

An embodiment of the invention provides an apparatus for the automatic inspection of vehicles being driven into a first area. The apparatus comprises: database means, means for capturing vehicle images, number plate recognition means and means for interrogating the database. It also include optional vehicle classification means for capturing vehicle image and processing this image to obtain the vehicle classification information. The database means contains: driver identification data identifying drivers who are permitted to drive vehicles into the first area; number plate data identifying vehicles which are permitted into the first area; data identifying which driver is permitted to drive which vehicle into the secure site and passenger identification data identifying passenger(s) who are permitted into the first area. The means for capturing is for capturing identification data about a driver who is driving the vehicle into the first area. The number plate recognition means is for capturing number plate data about the vehicle being driven into the first area. The optional vehicle classification means is for capturing classification data about the vehicle being driven into the first area. The means for driver and passenger identification data is for capturing driver and passenger data through the security card reader, biometric scanner (such as fingerprint verification device) image capturing and processing for facial recognition or any combination of these methods. The means for interrogating is for interrogating the database means on the basis of the captured identification data about the vehicle and driver who is driving the vehicle into the first area and on the basis of the captured driver identity, vehicle number plate data and optionally the vehicle classification data to determine whether or not that driver is permitted to drive that vehicle into the first area.

An embodiment of the invention provides a method for the automatic inspection of vehicles being driven into a first area. The method comprises the steps of: capturing an image and comparing the captured image. The captured images are images of the undercarriage, luggage compartment, driver and passenger of a vehicle as it is being driven into the first area. The captured images of the undercarriage, luggage compartment, driver and passenger of the vehicle being driven into the first area is compared with one or more stored images of the vehicles, driver and passengers which are permitted into the first area.

An embodiment of the invention provides a method for the automatic inspection of vehicles being driven into a first area. The method comprises: capturing data, reading a vehicle number and (optionally capturing vehicle classification data) to identify (and optionally to classify) the vehicle and determining whether a driver is permitted to drive a vehicle and/or passenger is permitted to enter into the first area. The captured data is identification data about a driver who is driving the vehicle and/or passengers entering into the first area. The vehicle number is the number on the vehicle license plate of the vehicle being driven into the first area. The optional vehicle classification data include vehicle type data such as whether it is a passenger car, a truck, a light goods vehicle, a heavy goods vehicle or a military vehicle. Vehicle classification data could also include height, length and color of the vehicle. Determining whether the driver is permitted to drive that vehicle into the first area is based on captured identification data about the driver who is driving the vehicle into the first area, on captured vehicle number plate data (with optional vehicle classification data), and on driver identification data identifying drivers who are permitted to drive vehicles into the first area. Determining the identity of driver/passenger(s) and whether the passengers are permitted to enter into the first area is based on data capture from security card, biometric scanner, driver/passenger(s) image(s) captured by camera and processed with computer vision based facial recognition method or any combination of these methods.

BRIEF DESCRIPTION OF THE DRAWINGS

The invention is further described by way of non-limitative embodiments with reference to the accompanying drawings, in which:—

DESCRIPTION

Figure 1:
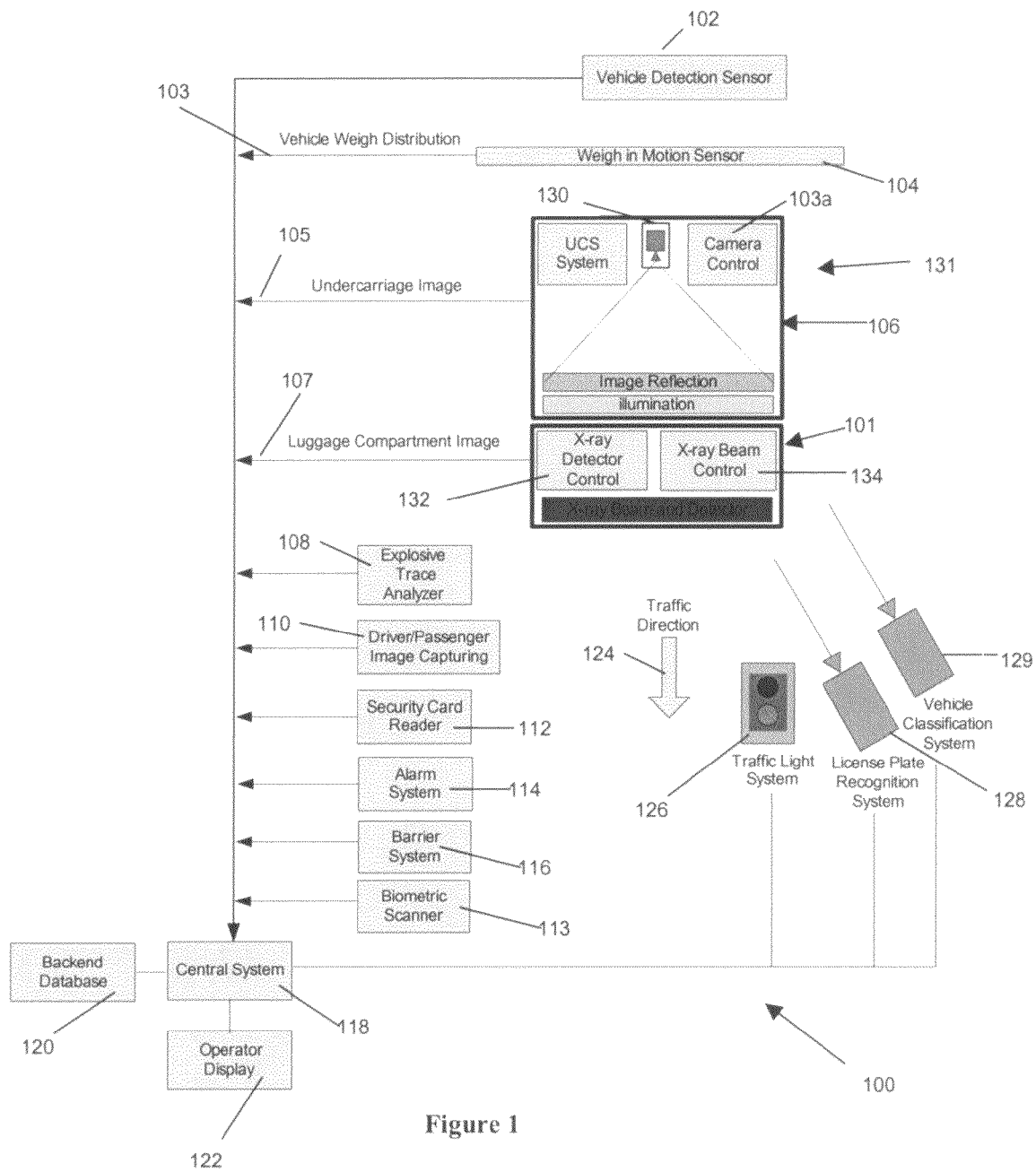
FIG. 1 is a block diagram showing the layout of an intelligent vehicle access control and inspection system according to an embodiment of the invention.

A layout of an example embodiment of an intelligent vehicle access control and inspection system 100 is illustrated in the block diagram of FIG. 1.

A vehicle (not shown) approaching a secure area in the traffic direction 124 sequentially passes through a series of interconnected sensors or devices.

Firstly, a vehicle detection sensor 102 detects the presence of an approaching vehicle thereby triggering the associated devices of the system 100. The vehicle detection sensor 102 is in the form of a proximity sensor. Alternatively or additionally, a light beam and photo-sensor, a ground loop detector, an image processing means or any combination therefor may be used in different embodiments. Upon detection of a vehicle, camera and license plate recognition (LPR) system 128 captures an image of the vehicle license plate. The camera and LPR system 128 identifies the number from the captured image of the license plate using computer vision based character recognition methods. The image of the vehicle license plate and the identified vehicle number and optional vehicle classification data obtained from processing the captured image are stored in a database 120.

The vehicle passes through a weigh-in motion sensors 104 of a vehicle weigh distribution system 103 for obtaining a two-dimensional weight distribution of the vehicle. The two-dimensional weight distribution of the vehicle is stored in the data base 120.

After this, the vehicle passes through an exterior undercarriage inspection system 106 wherein an undercarriage image 105 of the vehicle is obtained by an Undercarriage Scanning System (UCS) including a camera 130 and a camera control unit 103a. The camera 130 is a still picture camera in the example embodiment, but may additionally or alternatively be a video camera. The undercarriage image 105 of the vehicle is stored in the data base 120.

Subsequently, the vehicle passes through an interior inspection system, namely, an X-ray scanning unit 101, wherein an X-ray image 107 of the interior of a luggage compartment is obtained. The X-ray image 107 of the luggage compartment is stored in the data base 120. The X-ray unit 101 in the example embodiment consists of an X-ray detector control 132, coupled to an X-ray beam control 134. The X-ray technology used is backscatter technology which creates photo-like X-ray images revealing the threats that optical scan camera 130 may miss, including explosives, human, plastic weapons, and drugs. In backscatter X-ray technology, data from X-ray photons that are scattered from the object undergoing inspection is captured.

An explosive trace detector 108 analyses traces around the vehicle's interior for detecting the presence of explosive chemicals inside the vehicle. The trace detector 108 in the example embodiment is capable of detecting the trace amounts of most commercial and military explosives, including RDX, PETN, HMX, Black Powder, Ammonium Nitrate and etc at as low as nanogram level concentrations by non-contact sampling of the air surrounding the interior of vehicle. It analyzes the type of explosive and its concentration.

Next, the vehicle enters into an area where the driver/passenger may need to stop the vehicle for security check, and while the vehicle windows are wound down for inserting an identity card (not shown) into a security card reader 112 or verifying the driver/passenger's biometrics using a biometric scanner 113 or both, an image capturing device 110, such as a camera is activated for capturing the image(s) of the driver/passenger(s). The image(s) of driver/passenger(s) could be processed for driver/passenger identification using computer vision based facial recognition methods and are stored in the database 120.

The system 100 may be provided with a traffic light system 126 for giving visual indication to the drivers approaching an inspection area. Further, a barrier system 116 is provided to allow or deny access to vehicles in to the secure area.

During the above inspection steps, an alarm system 114 triggers at instants when a suspicious object is detected in the above-mentioned exterior and interior inspection procedures, or upon detection of any explosive trace, or on detection of a suspicious driver/passenger.

The components of the intelligent vehicle access control and inspection system 100 are connected to a central processing system 118 comprising a central operator display 122 for visual monitoring and the backend database 120 containing the database of various information, such as vehicle identification numbers, vehicle classification data, personal identification information of drivers/passengers such as biometrics and processed images, facial features for use in facial recognition etc.

The inspection of vehicles may be fully automated and there is no need for the driver and passenger to step out of the vehicle for opening the luggage compartment, during inspection. Further, an operator can operate and control vehicle access from a remotely positioned central processing system 118.

Figure 2A:
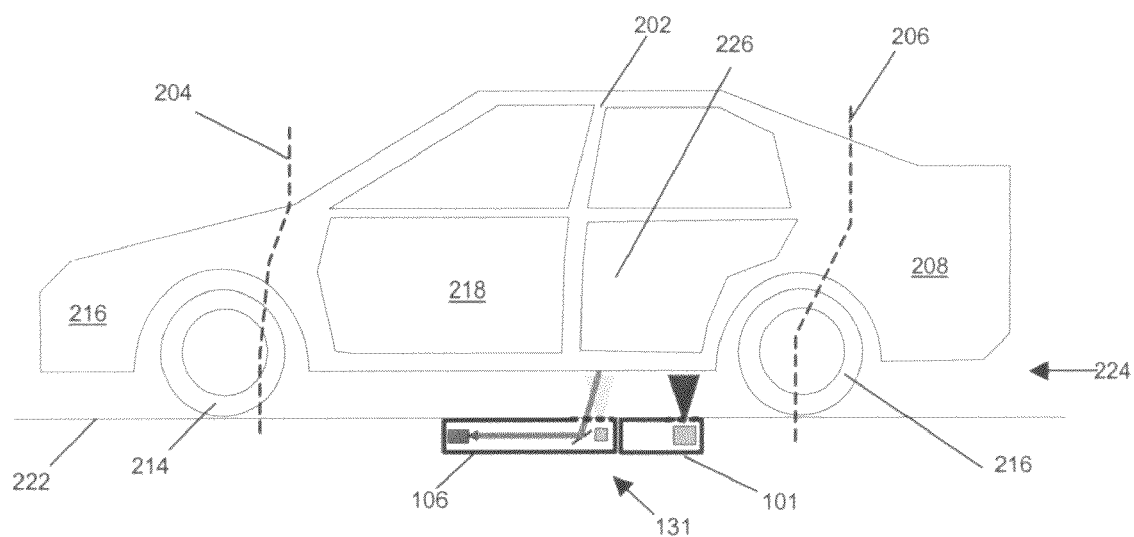
FIGS. 2A and 2B respectively are illustrative drawings showing the side and bottom views of a vehicle positioned on a vehicle scanning apparatus in accordance with an embodiment of the invention.
Figure 2B:
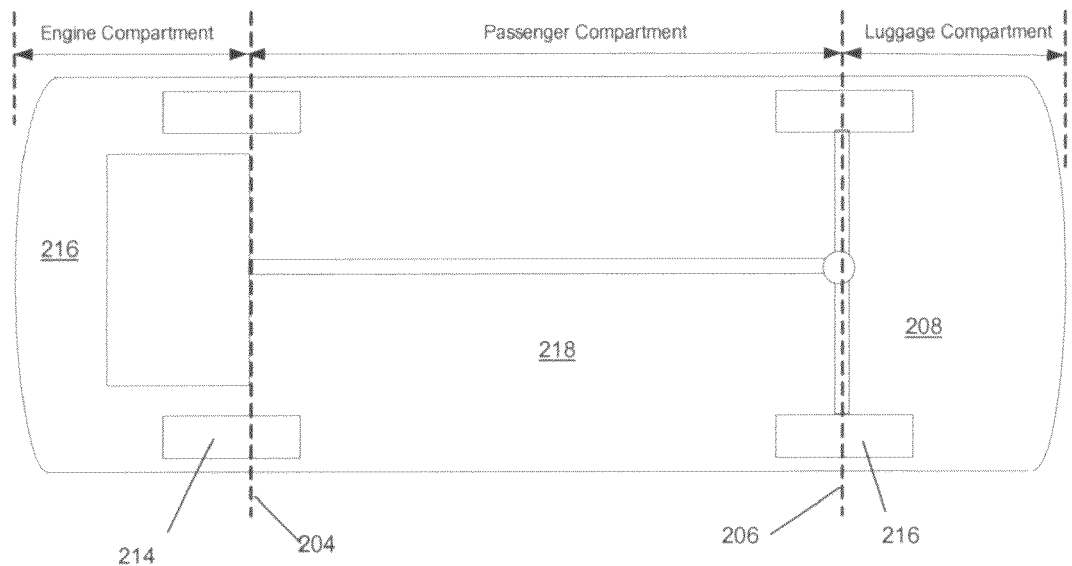

FIGS. 2A and 2B shows respectively the side and bottom views of a vehicle positioned on a vehicle scanning apparatus 131 in accordance with an embodiment of the invention.

The vehicle 202 is positioned on the vehicle scanning apparatus 131 which, in turn is located beneath a surface 222 of a secure area. The vehicle 202 may be divided into three compartments spread around the front axis 204 and the rear axis 206. The engine compartment 216 is the front portion of the vehicle 202 extending up to the front axis 204. The passenger compartment 218 is the central portion of the vehicle 202 extending between front axis 204 and the rear axis 206. The luggage compartment 208 is the rear portion of the vehicle 202 extending beyond the rear axis 206. In the example embodiment, the scanning apparatus 131 consists of an optical scan device 106 and an X-ray scan device 101 mounted adjacent to each other. The optical scan device 106 provides an optical image of the undercarriage of the vehicle 202, whilst the X-ray scan device 101 provides X-ray image of the interior of the vehicle e.g. the luggage compartment 208.

As a vehicle 202 approaches a secure area in a direction 224, the presence of the vehicle is detected by a vehicle detection sensor (not shown) which, in turn, activates the optical scan device 106. Upon activation, the optical scan device 106 scans the undercarriage of the vehicle and the scanned image is stored in a database 120 for further analysis. As the vehicle moves forward and upon detection of the back wheels 216, an X-ray scan device 101 is activated for scanning the luggage compartment 208. The back wheels 216 are detected by processing the under carriage images obtained by the optical scan device 106. The detection of the back wheels could also be supplemented by the use of a proximity sensor, a light beam and photo-sensor, an ultrasonic sensor or any combination of these sensors.

The X-ray scanning device 101 may alternatively be located by the side of the vehicle or on top of the vehicle, and is operable to be activated upon detection of the rear wheels 216 of the vehicle 202.

Figure 3:
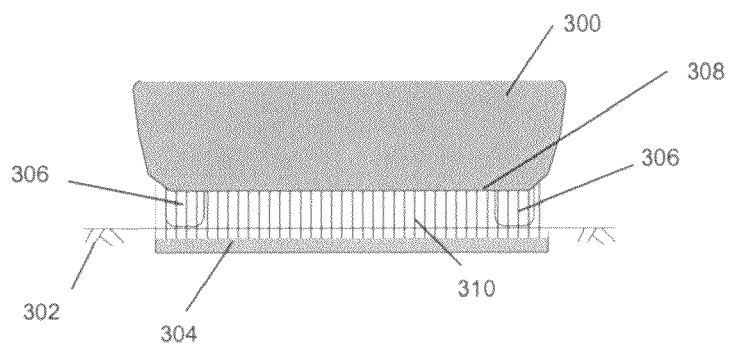
FIG. 3 is a partial front end-view of a vehicle positioned on the vehicle scanning apparatus in accordance with an embodiment of the invention.

FIG. 3 is a partial front end-view of a vehicle 300 having wheels 306 positioned on an optical scan device 304 mounted beneath a surface 302. From the optical scan device 304, an equal path length beam of light 310 is incident on the undercarriage 308 in order to obtain the images of the vehicle undercarriage 308 without any distortion.

Figure 4A:
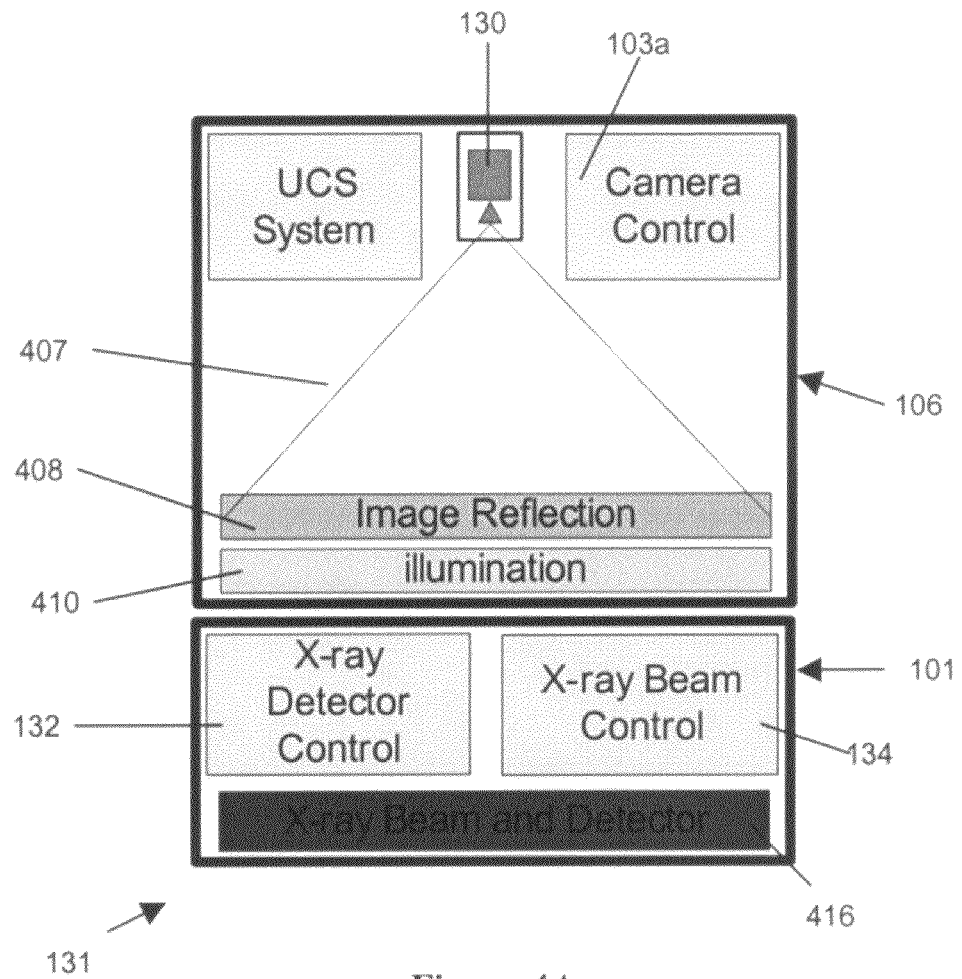
FIGS. 4A and 4B respectively illustrate the layout of the scanning system and scanning apparatus (plan view and longitudinal cross section) in accordance with an embodiment of the invention.

FIG. 4A illustrates the detailed layout of the scanning system 131 in accordance with an embodiment of the invention. The scanning system 131 consists of an optical scan system 106 and an X-ray scanning device 101. The optical scan system 106 is operable to scan the undercarriage of a vehicle by an optical beam 407, whilst the X-ray scan system 101 is operable to scan the luggage compartment of a vehicle using X-ray backscatter imaging techniques.

In the optical scan system 106, an uniform optical beam 410 is incident on an undercarriage of a vehicle to illuminate an elongate strip. The length of the strip is transverse to the length of the vehicle. The image of the illuminated strip 410 is reflected on a reflective material 408. The reflective material is vertically inclined to the undercarriage. The reflected image of the strip 410 is captured by an area-scan camera 103 and stored in the database (not shown) for analysis. As the vehicle moves, the scan system 106 produces a plurality of continuous strips of optical images extending over the entire undercarriage area of the vehicle. The plurality of the images of the undercarriage strips are further processed and stored in the database for analysis. A camera control system 103a controls the function of the area-scan camera 103 e.g. adjusting the camera focus.

In the X-ray scan system 101, an X-ray beam is incident on the luggage compartment of a vehicle and X-ray detector to measure the backscatter X-rays to obtain an X-ray image of an elongate strip in the luggage compartment. The image of the strip is stored in a database for analysis of the stored image. As the vehicle moves, the scan system 131 produces a plurality of continuous strips of X-ray images extending over the entire luggage compartment. The plurality of image strips are stored in the database for processing and analysis. The X-ray scan system 101 creates photo quality backscatter images by directing a sweeping beam of X-rays at the vehicle luggage compartment, and then measuring and plotting the intensity of scattered X-rays as a function of the beam position. The system can be configured with one or more backscatter X-ray detectors to provide maximum screening capability. This allows multiple X-ray views of the vehicles undergoing inspection, including both sides, top and bottom view. A X-ray beam control 134 and X-ray detector control 132 is coupled to the X-ray system 101.

Figure 4B:
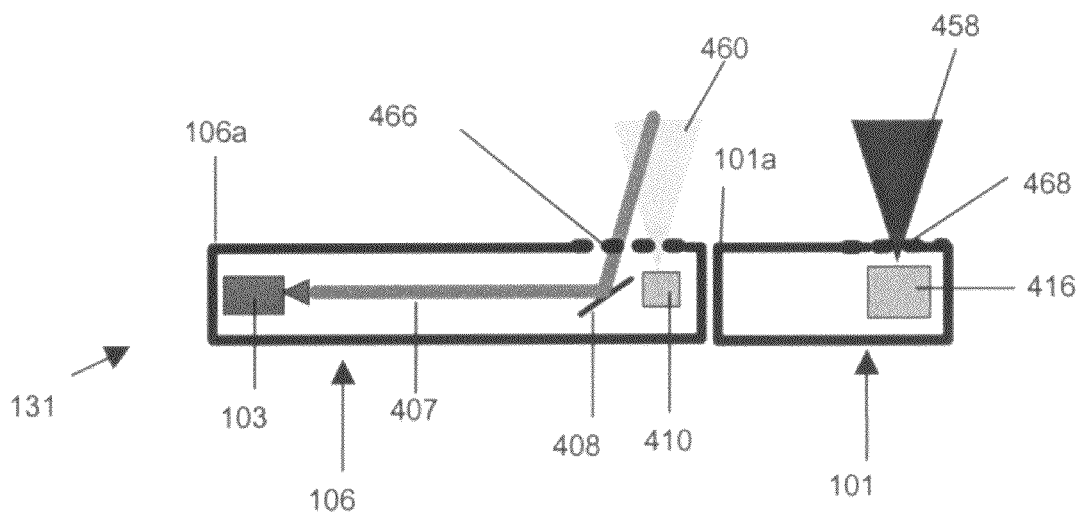

FIG. 4B illustrates the longitudinal cross section detailed layout of the scanning apparatus 131 in accordance with an embodiment of the invention. The scanning apparatus consists of two adjacently positioned chambers 106a, 101a. The chambers 106a, 101a are positioned beneath a surface of e.g. a vehicle inspection lane. A first chamber 106a contains the optical scan device 106, whilst a second chamber 101a contains the X-ray scan device 101.

The optical scan device 106 includes a light source 410 for emitting one or more beams of light out of an elongate slit 466. The width of the slit is chosen to cover the entire width of a vehicle under carriage. The elongate slit 466 is located transverse to the surface, above the light source 410. Thus, an equal optical path beam of light 460 is emitted out of the slit 466 for illuminating a strip of the vehicle undercarriage, in the upward direction. An image of the illuminated strip 460 is reflected on an inclined reflecting surface 408. The reflected image of the strip 407 is then captured by an area scan camera 103. The images are stored in a database for analysis. As the vehicle moves over the optical scan device, a series of images of strips corresponding to the under carriage of the vehicle is captured by the area scan camera 103 and stored in a database for processing and analysis.

The advantages of the above-described optical scan device are: (1) protection of the camera lens from vehicle oil drop or debris or snow; (2) any reflective material can be used to reflect the undercarriage image; (3) obtaining wider undercarriage image by adjusting the distance between the camera 402 and reflective plate 408; (4) obtaining best image quality by varying the angle of the reflective plate.

The second chamber 101a consists of an X-ray device 416 for emitting one or more beams 458 of X-ray from an elongate slit 468 located transverse to the surface and above the X-ray device 416. The width of the slit 468 is chosen to cover the entire width of a vehicle luggage compartment. For safety reasons, the X-ray emission is only activated after the detection of a rear wheel of the vehicle concerned.

The X-ray beam from the slit 468 is passed through the vehicle luggage compartment and an X-ray image of a strip of the corresponding luggage compartment is obtained from an X-ray detector of the X-ray device 416 and stored in a data base for further analysis. As the vehicle moves over the X-ray device 101, a series of images of strips corresponding to the luggage compartment is obtained and stored in a data base for processing and analysis. The X-ray device 101 is located within a protected housing to prevent any unwanted radioactive radiation.

Figure 5:
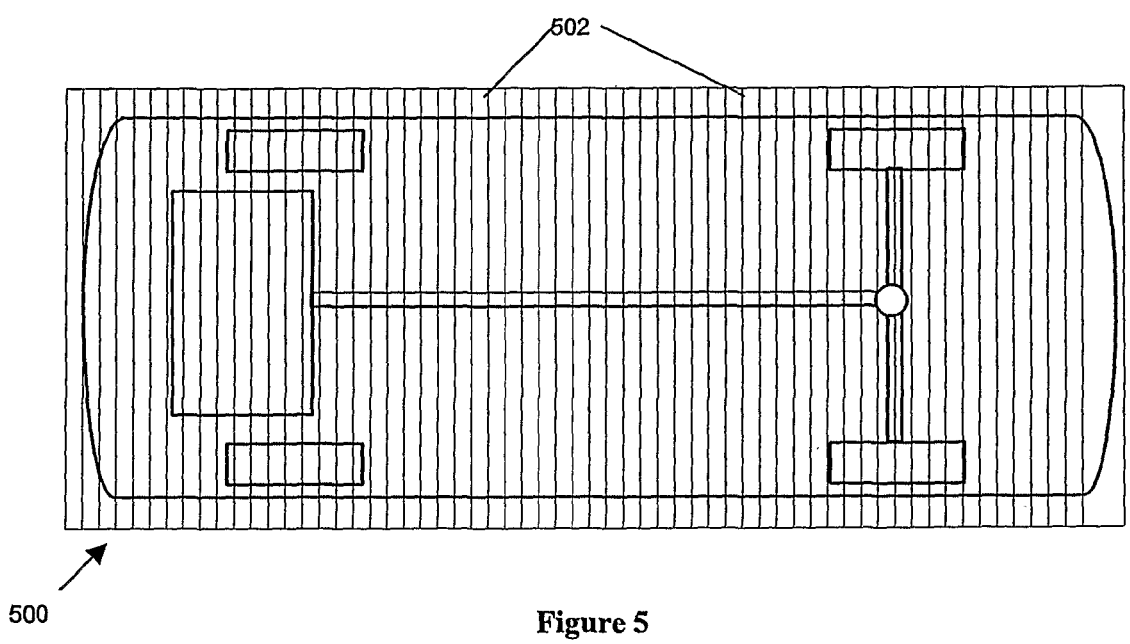
FIG. 5 is an exemplary view of image stripping and stitching of an undercarriage using an area-scan method in accordance with an embodiment of the invention.

FIG. 5 illustrates the image stripping and stitching of an undercarriage using an area-scan method in accordance with an embodiment of the invention. By utilising image processing and computer vision algorithms, the optical scan system of the present invention "stitches" together the plurality of overlapping discrete image strips 502 to produce a composite image complete undercarriage image. In order to detect image similarity, the strips 502 are made to overlap each other. The image stitching technology can provide advantages, such as uniform image quality in horizontal as well as vertical directions, and resilience to variations in vehicle speed.

Similar to the optical scan system, the X-ray scan system of the present invention also stitches together the plurality of discrete image strips to produce a composite image of the luggage compartment which are stored in a database for analysis.

FIGS. 6A to 6G illustrate a typical vehicle operation sequence of the intelligent vehicle access control and inspection system in accordance with an embodiment of the invention. FIGS. 6A to 6G are drawn to clearly understand the working of the system 100 whose components are described above with reference to FIGS. 1 to 5.

Figure 6:
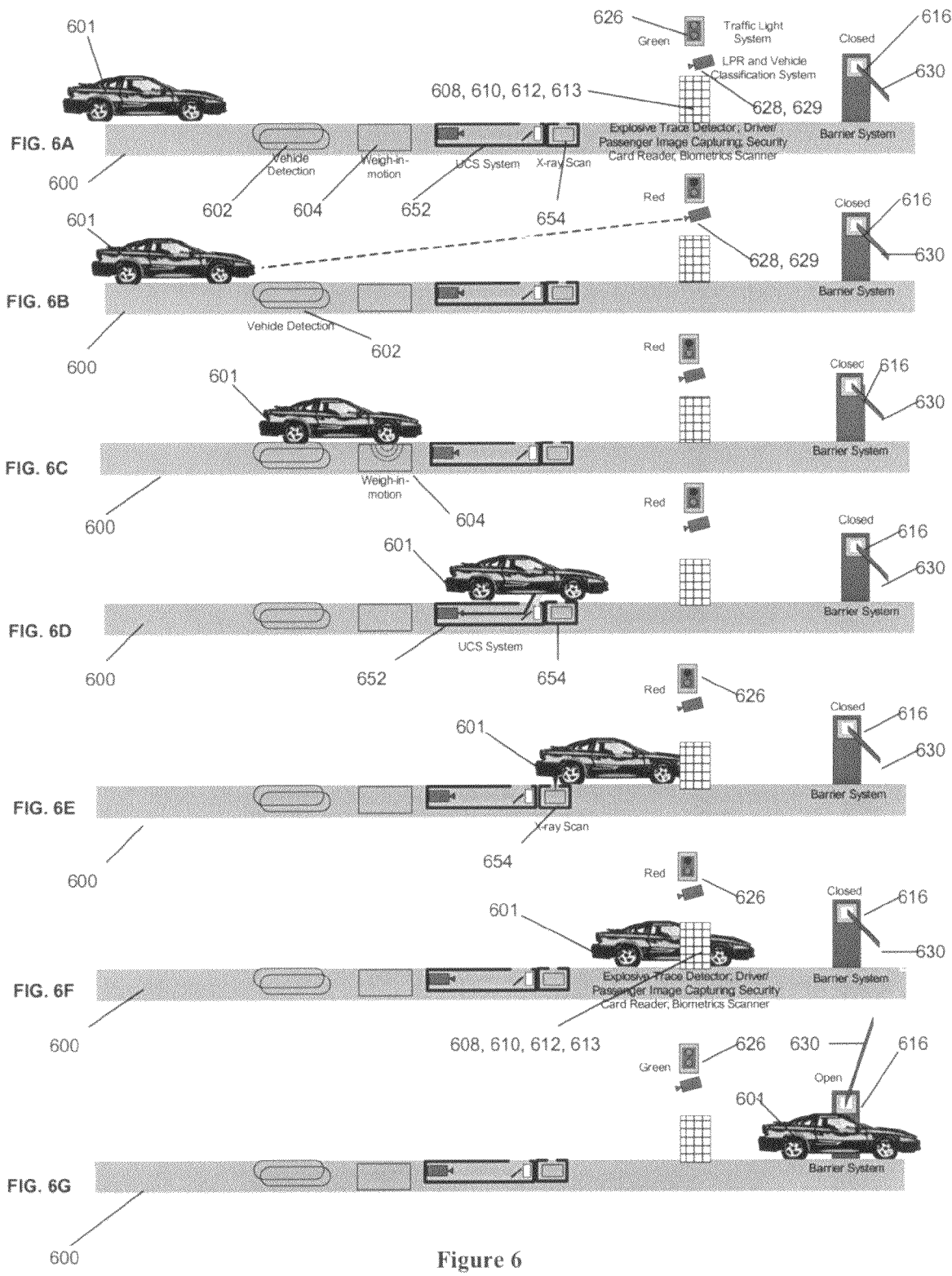
FIGS. 6A to 6G are illustrations of a typical vehicle operation sequence of the intelligent vehicle access control and inspection system in accordance with an embodiment of the invention.

Firstly, as shown in FIG. 6A, a vehicle 601 is shown to approach a secure area on a vehicle lane 600 employing an embodiment of a intelligent vehicle access control and inspection system 100 of the present invention. The traffic light 626 indicates a green signal inviting the vehicle drivers to move to the inspection area. The intelligent vehicle access control and inspection system is comprised of a plurality of sensors and devices that are mounted below or above the surface of the vehicle lane 600. In the example embodiment, the vehicle 601 is indicated to pass through a plurality of sensors including a vehicle detection sensor 602, a weigh-in motion sensor 604, an optical scan device 652, an X-ray scan device 654, explosive trace detector 608, a first imaging device 628, security card reader 612, optional biometric scanner 613, a second imaging device 610, an optional third imaging device 629, traffic light 626, and a barrier 616.

As shown in FIG. 6B, the presence of a vehicle is detected by the vehicle detection sensor 602, in the form of an optical detector. Alternatively or additionally, a ground loop detector, a proximity sensor, a light beam and photo-sensor, a camera and image processing system or combination thereof may be used indifferent embodiments. The detection of a vehicle initiates the other detectors or sensors of the system. As the vehicle moves closer, an image of the license plate of the vehicle 601 is captured by an over looking first imaging device 628, such as a camera. The first imaging device 628 is connected to a license plate recognition (LPR) system for identifying the number on the license plate using computer vision based character recognition methods. The recognized license plate number of the vehicle is stored as the vehicle identification data used by the system for searching the history of the vehicle. An optional third imaging device 629 is connected to the optional vehicle classification system for identifying the classification data of the vehicle using computer vision based vehicle feature extraction methods. The identified classification data of the vehicle is also stored as the vehicle classification data used by the system for verification of the vehicle identity. The traffic light 626 indicates a red signal once the vehicle 601 is detected by the vehicle detector 602.

In FIG. 6C, as the vehicle 601 moves over the weigh-in-motion sensors 604, a two-dimensional weight distribution graph of the vehicle 601 is generated by the system. The graph generated is used by the system to detect any abnormal loading distribution of the vehicle concerned. The traffic light 626 maintains the red signal.

In FIG. 6D, the vehicle 601 moves over an optical scan device 652 located within a housing either above ground or below ground level. As the vehicle 601 moves forward, images of the undercarriage strips are obtained by an area scan camera positioned inside the optical scan device 652. These images are stitched by the system to obtain a composite undercarriage image of the vehicle 601. The undercarriage image captured by the system is compared with previous undercarriage images from a database and if there is any discrepancy or if an analysis of the undercarriage image indicates the presence of any foreign object or any anomaly, an alarm is raised. The image of the detected foreign object may be traced and zoomed on a high-resolution screen by an operator for more detailed inspection.

In FIG. 6E, as the vehicle 601 moves forward, an X-ray scan device 654 is activated upon detection of the rear wheel. Upon activation, the X-ray device 654 emanates one or more beams of X-ray, which penetrates through the vehicle luggage compartment area. As the vehicle 601 moves forward, a plurality of X-ray images of the luggage compartment are obtained, These images are stitched by the system to obtain a composite image of the luggage compartment. The composite image of the luggage compartment is compared with previous luggage compartment images from a database and if there is any discrepancy or if an analysis of the luggage compartment image indicates the presence of any foreign object, an alarm is raised. The image of the detected foreign object may be traced and zoomed on a high-resolution screen by an operator for more detailed inspection. The traffic light 626 maintains the red signal at this position.

In FIG. 6F, as the vehicle 601 moves forward, the driver/passenger are prompted to wind down the vehicle window to enable the insertion of a security card into a card reader 612 or to perform biometric verification such as fingerprint verification using the biometric scanner 613. At this moment, the second imaging device 610, such as a camera is activated to capture the image of the driver/passenger(s). The captured images are stored in a database for image analysis such as facial recognition for identification of driver/passenger(s). In the embodiment, when the drivers opens the windows for security check, the area around the vehicle is analysed by an explosive trace analyzer 608 to check for the presence of any dangerous chemicals in the vehicle 601. If any illicit material is detected by the explosive trace analyzer, an alarm is raised. The traffic light 626 maintains the red signal at this position.

As illustrated in FIG. 6G, if no alarms are activated and as the vehicle moves out of the position shown in FIG. 6E, the data of a particular vehicle from all the sensor and devices are saved into a database for future reference and reporting. At this point, the barrier system 616 activates and open the barrier 630 to let the vehicle 601 proceed into the secured area. The traffic light 626 is turned to indicate a green signal for the inspection of the next vehicle.

Figure 7:
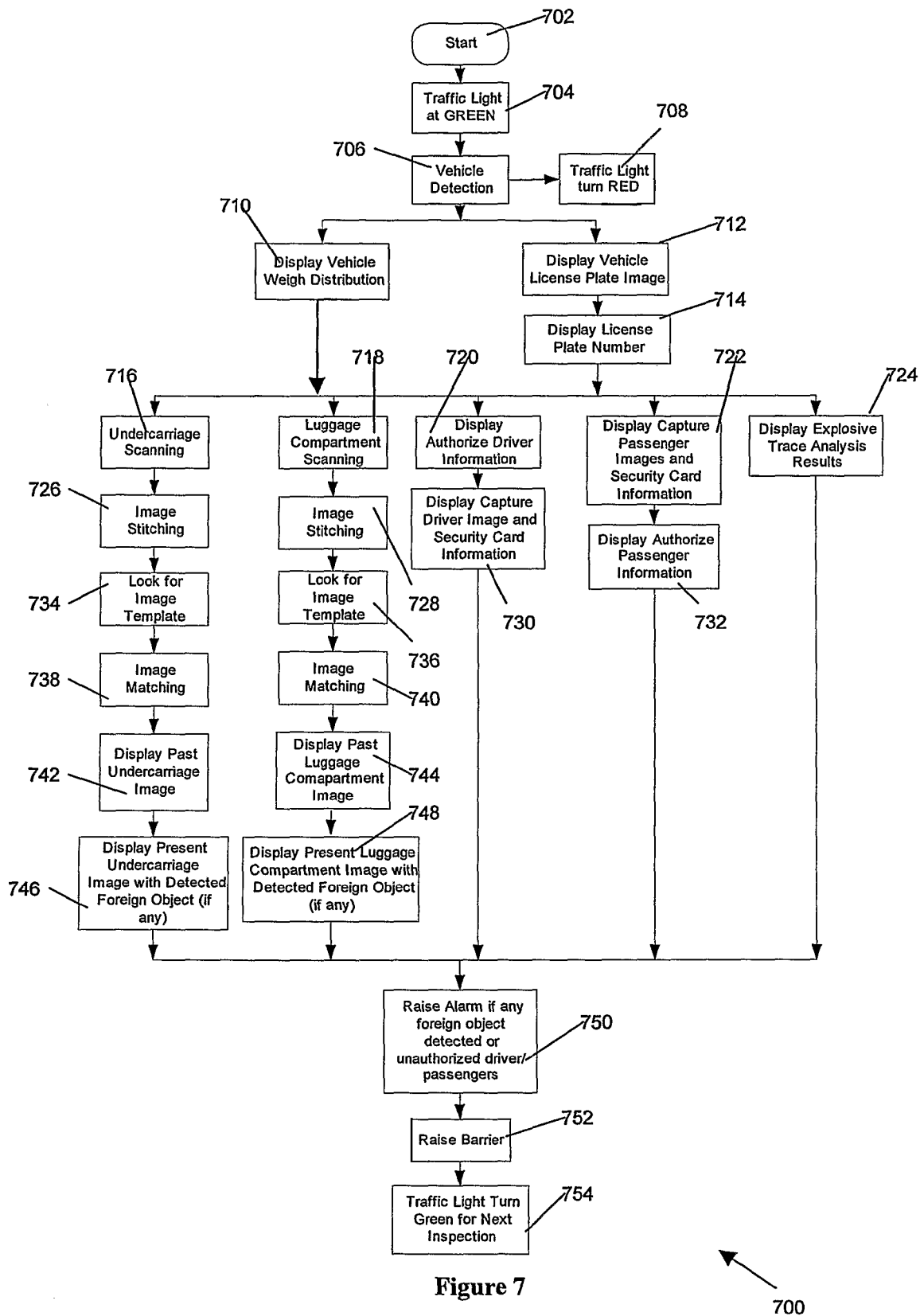
FIG. 7 is a flowchart illustrating the operation of an intelligent vehicle access control and inspection system in accordance with an embodiment of the invention.

FIG. 7 is a flowchart illustrating the operation of an intelligent vehicle access control and inspection system 700 in accordance with an embodiment of the invention. The system is capable of visually indicating the various data of a vehicle scanned on an operator console.

At step 702 a vehicle starts to enter a secure area having an intelligent vehicle access control and inspection system 700 in accordance with an embodiment of the invention. Upon receipt of a green signal from a traffic light at step 704, the vehicle enters the inspection area and is detected by a vehicle detection sensor at step 706. Once the vehicle is detected by the system 700, the system turns the traffic light to indicate a red signal to inform the others that a vehicle is being inspected.

As soon as a vehicle is detected, an image of the vehicle license plate and its corresponding number are obtained and stored in the database of the system 700. Optionally an image of the entire vehicle and its classification data are obtained and stored in the database of the system 700 The stored image of the vehicle license plate and its corresponding number (and optionally the vehicle overview image and its classification data) are displayed on an operator console respectively at steps 712 and 714.

A two-dimensional graph of the weight distribution of the vehicle is obtained and stored in the database of the system 700. An operator console is also displayed with the two-dimensional graph of the weight distribution of the vehicle at step 710.

At step 716, strips of optical images of the vehicle's undercarriage are captured by an area scan camera and stored in the database of the system. At step 726, the plurality of optical image strips corresponding to undercarriage of a vehicle are processed and stitched by the system 700 to obtain a composite image of the vehicle undercarriage. The composite images of the undercarriage is store in a database. At step 734, the composite image of the undercarriage is compared with those stored previously in the database. At step 738, when a matching of the present and past images are detected, the previous and present undercarriage images are displayed on a operator console respectively at steps 742 and 746. The system or the operator may raise an alarm at step 750 if there is a difference in undercarriage images indicating the presence of a foreign object.

At step 718, strips of X-ray images of vehicle's luggage compartment are obtained and stored in the database of the system. At step 728, the plurality of X-ray image strips corresponding to luggage compartment of the vehicle are processed and stitched by the system 700 to obtain a composite image of the vehicle luggage compartment. The composite images of the luggage compartment is stored in a data base. At step 736, the composite image of the luggage compartment is compared with those stored previously in the data base. At step 740, when a matching of the present and past images are detected, the previous and present luggage compartment images are displayed on a operator console respectively at steps 744 and 748. The system or the operator may raise an alarm at step 750 if there is a difference in luggage compartment images indicating the presence of a foreign object.

At step 720, the previously stored information of an authorised driver is displayed on a operator console. At step 730, the presently acquired driver/passenger information from a security card reader and/or biometric scanner as well as the image of the driver obtained from a camera are displayed on the operator console. The system or the operator may raise an alarm at step 750 if there is any difference in the images or information of a driver as verified against the database.

At step 722, the previously stored information of an authorised passenger(s) is displayed on a operator console. At step 732, the presently acquired passenger information from a security card reader and/or biometric scanner as well as the image of the passenger obtained from a camera are displayed on the operator console. The system or the operator may raise an alarm at step 750 if there is any difference in the images or information of the passenger as verified against the database.

At step 724, the results from a explosive trace analyser obtained from the vicinity of the vehicle is displayed on a operator console. The system or the operator may raise an alarm at step 750 if any suspicious chemicals or explosive devices are detected.

Once a vehicle obtains clearance from the inspection system and operator the barrier is raised at step 752 to allow the vehicle further in to the premises or for another inspection.

The traffic light indicates a green signal again to enable other vehicles to be inspected.

As indicated above, the system is operable to indicate the results of the whole inspection on the operator screen display for visual monitoring. The system may also be automated.

Apart from the conventional audio and visual alarms, the alerting mechanism in example embodiments may be operable to activate physical barriers, such as retractable bollards, raised kerbs, or spikes, which are capable of preventing the vehicle from proceeding or retreating.

Further, the inspection system installation may include physical protection means to reduce physical damage to the premises and the security system in case of an explosion, thereby protecting life and property.

The system according to embodiments of the present invention may be fixed or portable. A portable system is used in case of temporary monitoring is needed during any specific event. It will be appreciated by a person skilled in the art that in a portable system, the various components may be provided as portable above-ground modules for laying out along a driving surface for a particular secure area.

Embodiments of the invention seek to monitor, inspect and/or control vehicular access to civilian, military areas, border crossing, and potentially sensitive or threatened buildings and facilities. Embodiments of the invention relate to system and method for exterior and interior inspection of vehicles. The exterior inspection includes scanning of vehicular undercarriage, whilst the interior inspection includes scanning of vehicle luggage compartment, detection of explosive trace in a driver or passenger compartment, verification of driver/passengers, prior to vehicular entry into a area.

The results of external and internal inspections could provide useful inputs to a decision process of system to determine if a vehicle is allowed to enter into sensitive areas (or cross the border), or to await further inspection/processing.

Embodiments of the invention may allow for the scanning of the undercarriage and luggage compartment of a vehicle for explosives or other illicit material, verification of both the identity of the driver, passengers and the identity (and optionally the classification data) of the vehicle, to establish that the particular vehicle is permitted into a sensitive site and that it is currently being driven by a driver who is permitted to drive it into that site.

Embodiments of the invention can allow for the scanning of the undercarriage and luggage compartment of a vehicle for explosives or other illicit material, vehicle interior explosive trace detection and verification of both the identity of the driver/passenger and the identity (and optionally the classification) of the vehicle, to establish that the particular vehicle is permitted into a sensitive site and that it is currently being driven by a driver who is permitted to drive it into that site.

The invention is not limited the above embodiments. However, those skilled in the art will recognise that the invention can be practiced, with modification, in the light of the information contained herein without departing from the scope of the invention.

The invention claimed is:

1. A system for automatic exterior and interior inspection of vehicles, said system comprising:
   optical imaging means for capturing an optical image of the undercarriage of the vehicle as it is being driven into a secure area;
   a backscatter mode X-ray camera for capturing an X-ray image of a luggage compartment of the vehicle as it is being driven into the secure area said X-ray camera being activated when the back wheels of said vehicle are detected from said optical image;
   a database for storing captured X-ray images;
   weighing means for obtaining a two-dimensional weight distribution of the vehicle, and monitoring means operable to facilitate activation of an alarm based on said captured X-ray images and said obtained two-dimensional weight distribution.

2. The system as claimed in claim 1, further comprising trace means for explosive trace detection of the vehicle interior by non-contact sampling of air surrounding the interior of vehicle as it is being driven into the secured area; and the monitoring means is further operable to facilitate activation of an alarm based on an input from the trace means.

3. The system as claimed in claim 1, further comprising processor means for comparing the captured images of the vehicle with one or more reference stored images stored in the database means; and the monitoring means is further operable to facilitate activation of an alarm based on an input from the processor means.

4. The system as claimed in claim 1, further comprising number plate recognition means for capturing number plate data of the vehicle being driven into the secured area; and the monitoring means is further operable to facilitate activation of an alarm based on a comparison of the number plate data with reference data stored in the database.

5. The system as claimed in claim 4, wherein the number plate recognition means comprises a camera and a license plate recognition (LPR) system which processes the image of the vehicle number plate captured by the camera using computer vision based character recognition.

6. The system as claimed in claim 1, further comprising means for capturing the vehicle classification information of the vehicle being driven into the secured area; and the monitoring means is further operable to facilitate activation of an alarm based on a comparison of the vehicle classification data with reference to data stored in the database.

7. The system as claimed in claim 6, wherein the vehicle classification means comprises a camera and a vehicle classification system which processes the image of the vehicle captured by the camera using computer vision based vehicle feature extraction to extract the vehicle classification data.

8. The system as claimed in claim 1, further comprising means for capturing identification data about a driver who is driving the vehicle into the secured area; and the monitoring means is further operable to facilitate activation of an alarm based on a comparison of the identification data with reference data stored in the database.

9. The system as claimed in claim 8, wherein the means for capturing identification data comprises one or more of a group consisting of a card reader, a camera, and a biometric scanner.

10. The system as claimed in claim 1, wherein the two-dimensional weight distribution is obtained by analyzing a two-dimensional weight distribution graph of the vehicle when entering the secure area and the system is operable to activate the alarm based on any abnormality in the two-dimensional weight distribution graph.

11. The system as claimed in claim 1, further comprising means for detecting approach of the vehicle into the secure area, and means for activating components of the system in response to an input from the means for detecting.

12. The system as claimed in claim 1, wherein the optical imaging means for capturing the optical image of the undercarriage of the vehicle comprises a reflection mode camera.

13. A method of automatic exterior and interior inspection of vehicles, said method comprising:

capturing an optical image of the undercarriage of the vehicle as it is being driven into a secure area;

detecting the back wheels of the vehicle from said optical image;

capturing an X-ray image of a luggage compartment of the vehicle upon detection of said back wheels;

storing the captured X-ray images;

obtaining a two-dimensional weight distribution of the vehicle; and activating an alarm based on said captured X-ray images and said obtained two-dimensional weight distribution.

14. The method as claimed in claim 13, said method further comprising:

detecting explosive trace of the vehicle interior by non-contact sampling of air surrounding the interior of vehicle as it is being driven into the secured area; and activating an alarm when an explosive trace is detected.

* * * * *